April 1, 1924. 1,488,878
F. HEATH
AUTOMATIC VALVE
Filed Feb. 12, 1923
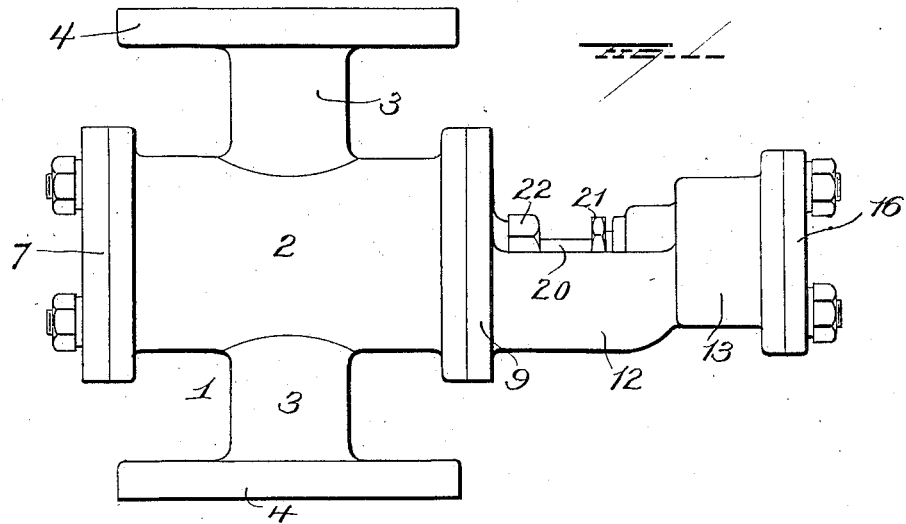
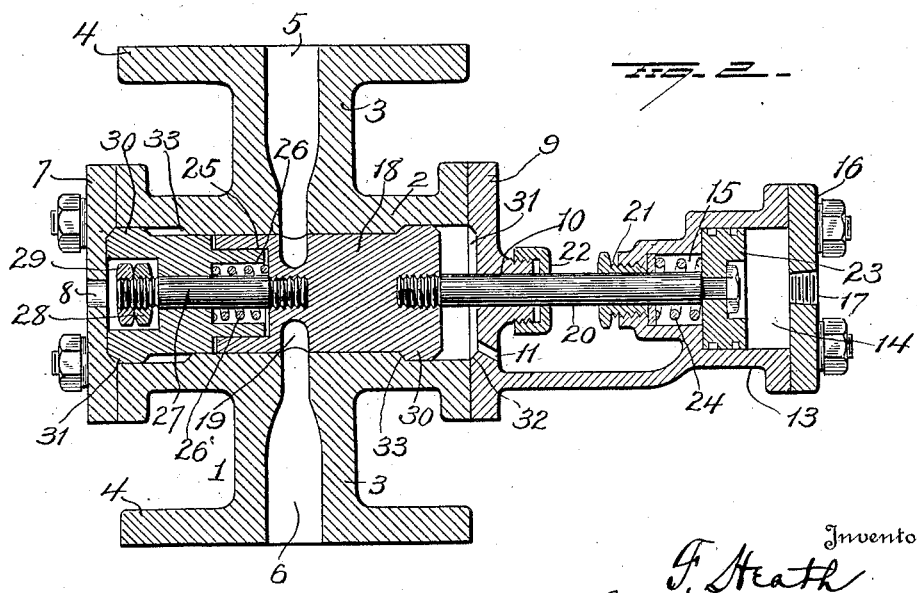
Inventor
F. Heath
By Seymour & Bright
Attorneys Patented Apr. 1, 1924.

1,488,878

UNITED STATES PATENT OFFICE.

FREDERICK HEATH, OF BELLINGHAM, WASHINGTON.

AUTOMATIC VALVE.

Application filed February 12, 1923. Serial No. 618,580.

*To all whom it may concern:*

Be it known that I, FREDERICK HEATH, a citizen of the United States, and a resident of Bellingham, in the county of Whatcom and State of Washington, have invented certain new and useful Improvements in Automatic Valves; and I do hereby declare the following to be a full, clear, and exact description of the invention, such as will enable others skilled in the art to which it appertains to make and use the same.

This invention relates to automatic valves and has special reference to valves which are normally open to admit motive fluid to a pump or similar mechanism and are closed upon a reduction of pressure in the delivery line of the pump. While the valve is capable of use in various fields, it is intended more particularly for use in steam-boiler plants using oil as fuel and is so arranged in the plant or system that if a leak should develop in the delivery line the resulting reduction of the oil pressure will cause the valve to close and cut off the flow of motive fluid to the pump which will thereupon cease to operate. The objects of the present invention are to simplify the construction and enhance the efficiency of the valve, to effect firm seating of the valve body in both open and closed positions, and to compensate for unequal seating of opposite ends of the valve body. The invention is illustrated in the accompanying drawing and will be hereinafter fully set forth.

In the drawing, Figure 1 is a side elevation of my improved valve, and

Figure 2 is a central longitudinal section thereof.

The valve casing 1 is constructed to present a central cylindrical body 2 with arms 3 projecting upwardly and downwardly therefrom, attaching flanges 4 being provided at the ends of the arms whereby the casing may be secured in the line delivering motive fluid to the pump. An inlet passage 5 leads through the upper arm 3 into the cylinder and an outlet passage 6 leads from the cylinder through the lower arm 3. One end of the cylinder is closed by a head 7, bolted thereto and constructed with a vent opening 8, while the opposite end of the cylinder is closed by a head 9 having a central opening 10 to receive a valve stem and also having a vent opening 11. From the outer side of the head 9 extends a supporting arm or web 12 which carries an auxiliary cylinder 13 at its outer end, said auxiliary cylinder being alined axially with the cylinder 2 and having an outer working chamber 14 and inner chamber 15 of less diameter than the chamber 14. The outer end of the auxiliary chamber is closed by a head 16 having a threaded opening 17 therethrough in which opening is to be secured the end of a branch pipe leading from the delivery line of the oil pump.

The valve body 18 is a piston slidably but closely fitted in the cylinder 2 and having an annular groove 19 in its surface intermediate its ends which, in the normal operative position of the valve, establishes communication between the inlet 5 and outlet 6. A stem 20 is secured in one end of the piston and extends through the opening 10 in the head 9 and through a stuffing box 21 fitted in the inner end of the auxiliary cylinder 13, a stuffing box 22 being mounted on the head 9 around the stem, as shown and as will be readily understood. A piston 23 is secured on the stem within the chamber 14 and a spring 24 is disposed within the chamber 15 to expand against said piston and against the end of the chamber thereby tending constantly to move the piston to the outer end of the chamber 14.

The piston 18, it will be readily noted, is constructed in two sections or members, the major member having the groove 19 formed therein and the stem 20 secured thereto. The major member is provided with a central recess 25 in its end remote from the stem 20 and the minor member is provided at its inner end with a boss 26 fitting within said recess and housing an expansion spring 26'. A coupling rod 27 is secured in the recessed end of the major piston member and extends axially through the minor member, securing nuts 28 being fitted on the outer end of the rod within a recess 29 in the outer end of the minor member of the piston. An annular enlargement or head 30 is formed at the outer end of each piston member and the respectively adjacent cylinder heads are each formed with a recess 31 in its inner face within which the head 30 may closely fit. The annular wall of the recess 31 is beveled or obliquely disposed thereby presenting a shoulder or seat 32 for the valve piston and upon the circumferential wall of the bore of the cylinder, spaced from the ends thereof, are seats or shoulders 33 similar in form to the seats or shoulders 32 but reversed with respect thereto. The bore of the cylinder is enlarged at its ends and the heads 30 of the piston are of corresponding diameter so as to fit closely within the enlarged end portions of the bore and firmly engage the respective seats.

In the normal position of the parts, shown in Figure 2, steam to operate the pump will flow through the passages 5 and 6 and the groove 19 and oil under pressure from the oil delivery line will fill the chamber 14 so as to hold the piston 23 against the inner end wall of the chamber, the spring 24 being under compression. Sould there be an abnormal variation and loss of pressure in the oil line, the tension of the spring 24 will overcome the pressure on the outer side of the piston 23 and will force the same outward thereby shifting the groove 19 out of alinement with the passages 5 and 6 and cutting off the flow of steam. The parts will remain in this cut-off or inoperative position until the leak has been repaired and the pressure in the oil line manually or otherwise reestablished.

It will be readily noted that the shoulders or seats 32 and 33 present four stops to limit the movement of the piston and that in both closed and open positions the piston engages a seat at each end whereby to prevent steam flowing past the piston and building up a pressure in the end of the cylinder which might interfere with the successful operation of the device. In the use of ordinary double-seating valves heretofore, very close work has been necessary to obtain the desired tight closing of the valve as various causes contributed to prevent both seats being properly engaged. When the valve is moved to working position the outer end of the minor member will seat against the shoulder 32 in the head 7 and if the major section should then be out of actual contact with the respective seat 33 the pressure of the oil will continue to act upon the member and move it to said seat, the spring 26 yielding to the movement. It will be noted that the working parts of the device are all housed so as to be protected from injury and that the construction and arrangement are such that the parts may be easily assembled, and as easily disassembled should repairs be necessary.

Having fully described my invention what I claim as new and desire to secure by Letters-Patent, is:—

1. In a valve of the class described, the combination with a casing having oppositely disposed inlet and outlet openings, of a two-part valve in said casing between and extending across said openings, one of the parts having an annular groove normally establishing communication between said openings, a pair of seats in the casing at each end thereof for the respective parts of said valve, expansible means between the parts of said valve to compensate for dissimultaneous seating thereof, and operating means for the valve.

2. In a valve of the class described, the combination of a cylinder having oppositely disposed inlet and outlet openings and provided with spaced seats at both sides of said openings, a piston valve within the cylinder adapted to cut off or establish communication between the inlet and outlet openings, heads at the ends of the piston each disposed between a pair of seats and adapted to engage either seat of the pair, and means to compensate for dissimultaneous seating of the heads.

3. In a valve of the class described, the combination of a valve casing having a plurality of seats at each end and having oppositely disposed inlet and outlet ports, a valve body having a plurality of seating portions each adapted to engage one of the seats on the valve casing and constructed between its ends to establish communication between the inlet and outlet ports, and means to compensate for unequal approach of the seating portions of the valve body to the respective seats on the casing.

4. In a valve of the class described, the combination of a cylindrical valve casing having seating shoulders at each end, a piston mounted in the casing, a head at each end of the piston adapted to engage the seating shoulders, and means for operating the piston, said piston consisting of a major member, and a minor member carried by the major member in axial alinement therewith and yieldably connected therewith.

5. In a valve of the class described, the combination of a valve cylinder having a plurality of seating shoulders, and a valve piston having heads at its ends to engage the seats, said piston consisting of a major section, a minor section alined axially with the major section, a coupling rod secured in the end of the major section and slidably supporting the minor section, means for retaining the minor section on the coupling rod, and a yieldable spreader between the opposed ends of the sections, the sections being fitted telescopically together about the spreader.

In testimony whereof, I have signed this specification in the presence of two subscribing witnesses.

FREDERICK HEATH.

Witnesses:
ARCHIE W. SHIELS,
FRANK BURNET.